United States Patent [19]

Sacco

[11] 4,300,533
[45] Nov. 17, 1981

[54] DESIGN OF HYDRAULIC CIRCUITS FOR THE AUTOMATIC OPERATION OF HELIOSTATS

[76] Inventor: Leonard R. Sacco, 762 Tuolumne Ave., Thousand Oaks, Calif. 91360

[21] Appl. No.: 63,731

[22] Filed: Aug. 6, 1979

[51] Int. Cl.$^3$ .................. F24J 3/02; G01J 1/20; G03B 21/00
[52] U.S. Cl. ........................ 126/425; 353/3; 250/203 R
[58] Field of Search .............. 353/3; 126/424, 425; 250/203 R; 60/641, 531

[56] References Cited

U.S. PATENT DOCUMENTS

| | | | |
|---|---|---|---|
| 3,680,307 | 8/1972 | Michalec | 126/425 |
| 4,063,543 | 12/1977 | Hedger | 250/203 R |
| 4,175,391 | 11/1979 | Baer | 126/424 |
| 4,198,954 | 4/1980 | Meijer | 353/3 |

FOREIGN PATENT DOCUMENTS 1493 4/1979 European Patent Off. ........ 126/425

*Primary Examiner*—Samuel Scott
*Assistant Examiner*—G. Anderson
*Attorney, Agent, or Firm*—Dennis L. Mangrum

[57] ABSTRACT

The present invention relates to automatic thermal/hydraulic logic system for continuously positioning a heliostat in alignment with the sun in both the horizontal and vertical planes. Solar radiation is monitored by phials which produce signal pressures of a magnitude that varies with phial exposure to the rays of the sun. The produced signal pressures are directed to thermally controlled valves which are compared with mechanically controlled valves of similar design feature. These control valves are centered so long as hydraulic fluid pressure signals on each end of a control valve are equal, but the valve spool is displaced to the left or to the right if and when a pressure differential is created, (improper alignment). When a specific differential sets in, a mechanical action takes place which moves the heliostat to its proper concentrating position. Movement ceases when the differential disappears (proper alignment).

12 Claims, 6 Drawing Figures

DESIGN OF HYDRAULIC CIRCUITS FOR THE AUTOMATIC OPERATION OF HELIOSTATS

BACKGROUND OF THE INVENTION

1. Field of the Invention

The present invention relates generally to a system for continuously positioning a heliostat, and specifically to an automatic hydraulic logic for driving a heliostat.

2. Prior Art

Efforts to concentrate the energy from the sun to produce heat or power date back perhaps to the day of Archimedes. Heliostats are a result of these efforts. They are normally large reflective surfaces which must be continuously positioned to be aimed at the sun and in most cases must be in a normal relationship to the sun at all operative times. Today, there are several methods for harnessing this energy source. For power generation however, high temperature of the medium is necessary, especially for economic reasons. This high temperature can, at the present state of the art, be only gained by concentrating the sun's rays on to a heat exchanger which carries the energy medium. Concentration means that the equipment must be normal to the sun's rays at all times. This normalization is frequently accomplished by employing various positioning devices which are connected to the heliostat. Some prior art devices employ electric/electronic systems to control the motion of the heliostat. Computers are often used for heliostat control positioning. It should be noted that in these cases electrical power must be available to continuously position the heliostat.

The use of heliostats, on any wide scale, as a viable energy service has been limited for several reasons: (1) Availability and low cost of fossil fuel; and (2) Energy storage problems.

Today, however, a real urgency exists for implementation of alternate power sources such as solar power, due to the impending crisis, the high cost of fossil fuel and improvements in energy conversion devices.

Heliostats must be continuously directed or aimed at the sun in order to function at maximum efficiency. Therefore, heliostats require a guidance system to track the sun and a mechanical system to continuously move it in both the horizontal and vertical plane. The prior art devices for continuously moving the heliostat have been energy inefficient, mechanically complex, and required much maintenance.

The present invention provides a device for continuously and simultaneously positioning a heliostat in relation to the sun. The device system uses hydraulic energy coupled with simple hydraulic circuits that provide automatic operation for any kind or form of heliostat to obtain simultaneous movements in the vertical and horizontal axis. No seasonal adjustments are necessary as the hydraulic circuits have inherent capabilities that take care of these variations. No electrical energy in any form is employed in control.

SUMMARY OF THE INVENTION

An automatic thermal/hydraulic device for continuously aligning a heliostat in both the horizontal and vertical planes is disclosed. The device is comprised of specially positioned phials which when exposed to the sun create fluid pressure in capillary lines coupled to a hydraulic logic system which drives a mechanical system to continuously align the heliostat with the sun. The hydraulic system is comprised of 3 hydraulic logic circuits, a train circuit, an elevation circuit and a zeroing circuit.

It is an object of the present invention to provide a device for continuously aligning a heliostat in both the horizontal and vertical place.

It is another object of the present invention to provide a device for continuously aligning a heliostat which does not require daily and/or seasonal adjustment.

It is still another object of the present invention to provide a device for continuously aligning a heliostat which does not employ electrical or electronic devices for operation.

It is yet another object of the present invention to provide a device for continuously aligning a heliostat for driving large heavy heliostats which are required for practical power generation facilities.

It is a further object of the present invention to provide a device for continuously aligning a heliostat at a cost efficient and that can be fabricated from off the counter components.

It is yet another object of the present invention to provide a device for continuously aligning a heliostat that will have little or no maintenance.

It is also an object of the present invention to provide a device to cycle the heliostat after sunset to prepare it for normal successive operating modes.

BRIEF DESCRIPTION OF THE DRAWINGS

FIG. 6, is a schematic illustration of the zeroing, circuit and mechanical drives of the present invention.

DETAILED DESCRIPTION OF THE PREFERRED EMBODIMENT

Figure 3:
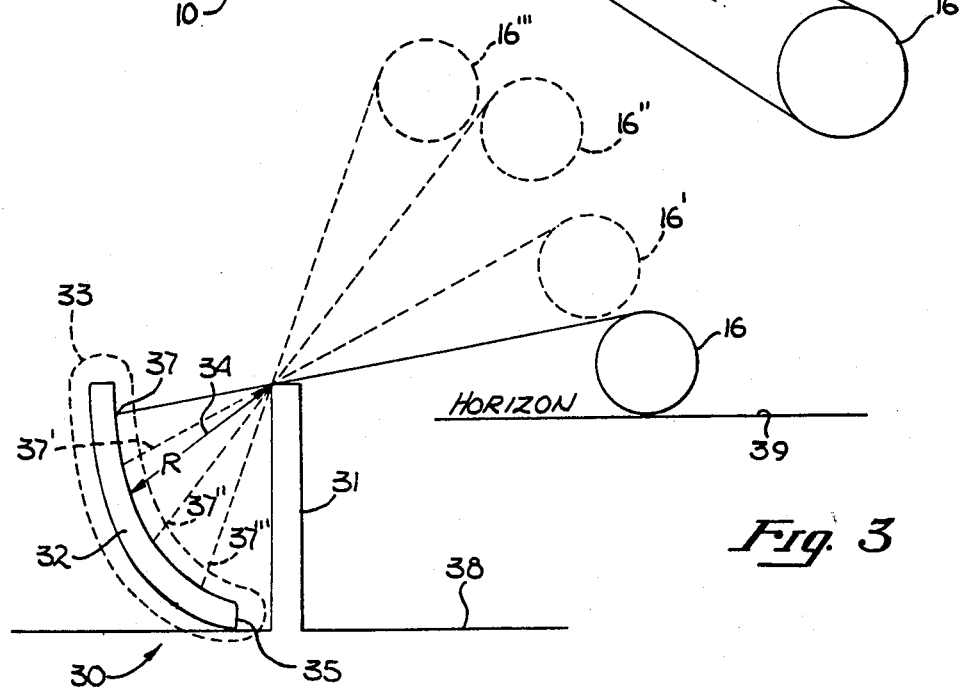
FIG. 3, is a plan view of the elevation tracking mechanism.
Figure 4:
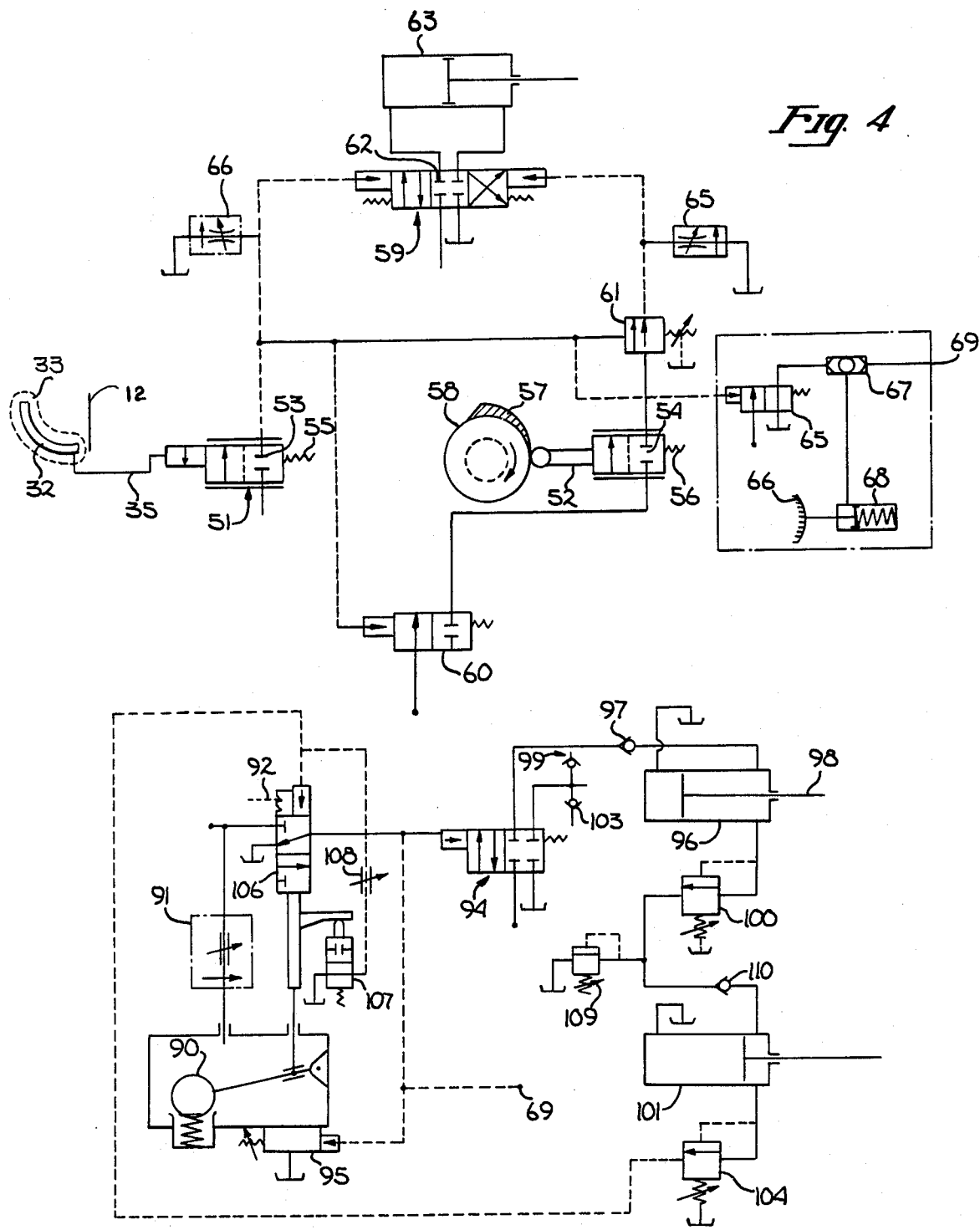
FIG. 4, is a schematic illustration of the elevation/-depression hydraulic logic circuit, mechanical drives and phial of the present invention.
Figure 5:
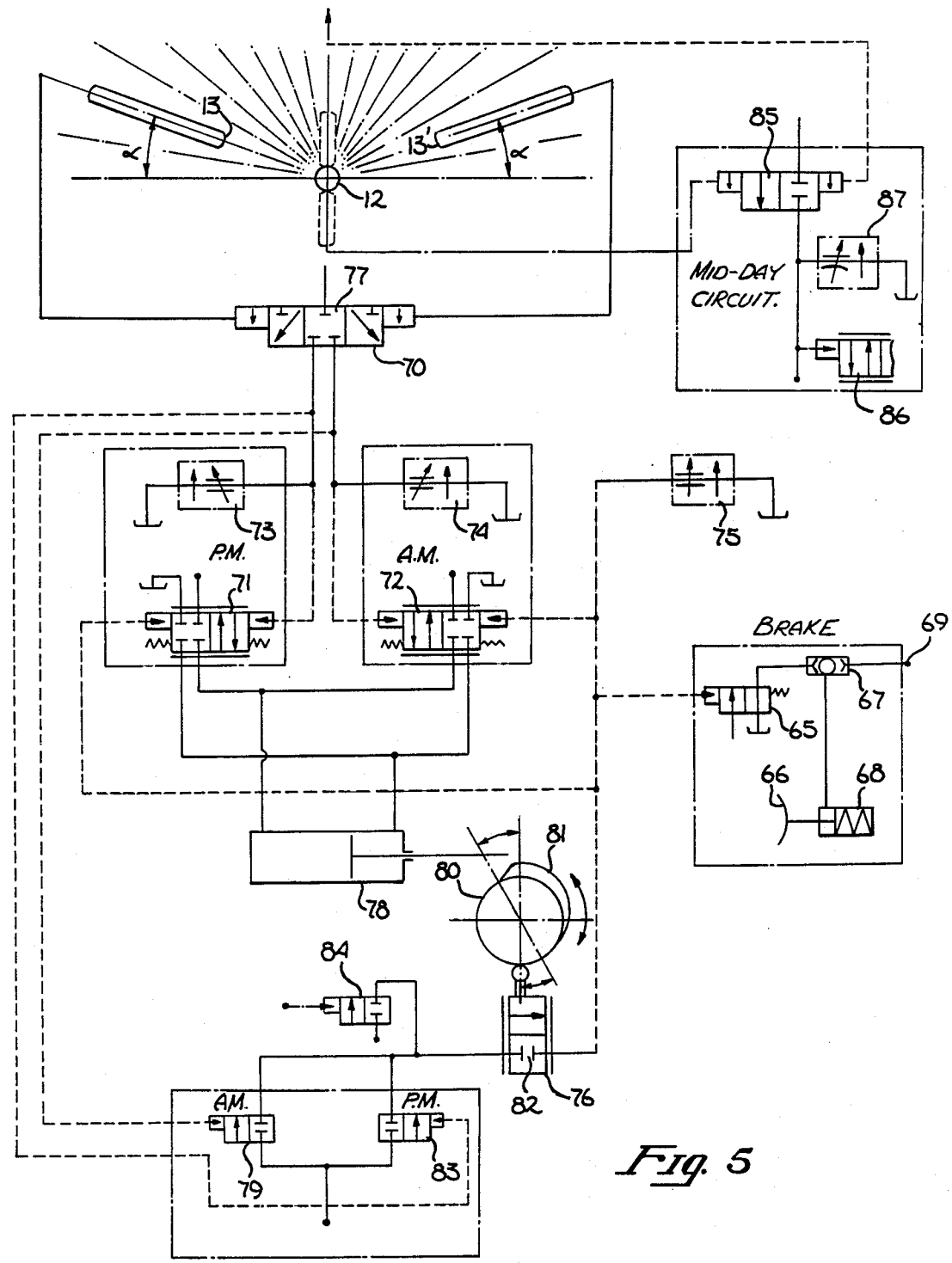
FIG. 5, is a schematic illustration of the train circuit; mechanical drives and solar phial of the present invention.

The present invention is a device for automatically and continuously driving a heliostat for directional alignment with the sun. Heliostats (not shown) are surfaces which are shaped for collecting and concentrating solar radiation and for directing it towards solar cells, optical thermal systems, or the like, for converting the radiant energy to alternate power forms, ie., electrical. A requirement for all heliostats is that they be in continuous alignment in the horizontal and vertical plane at all times with the sun. The present invention is a device capable of continuously tracking the sun and aligning the heliostat in proper position. The system is automatic and derives its energy partly from the sun and partly from a hydraulic energy source. The transverse tracking mechanism is best described in reference to FIGS. 1 and 2. The elevation tracking mechanism is illustrated in FIG. 3. The hydraulic logic circuits and mechanical driving mechanism are best illustrated in FIGS. 4, 5, and 6, in schematic form.

Figure 1:
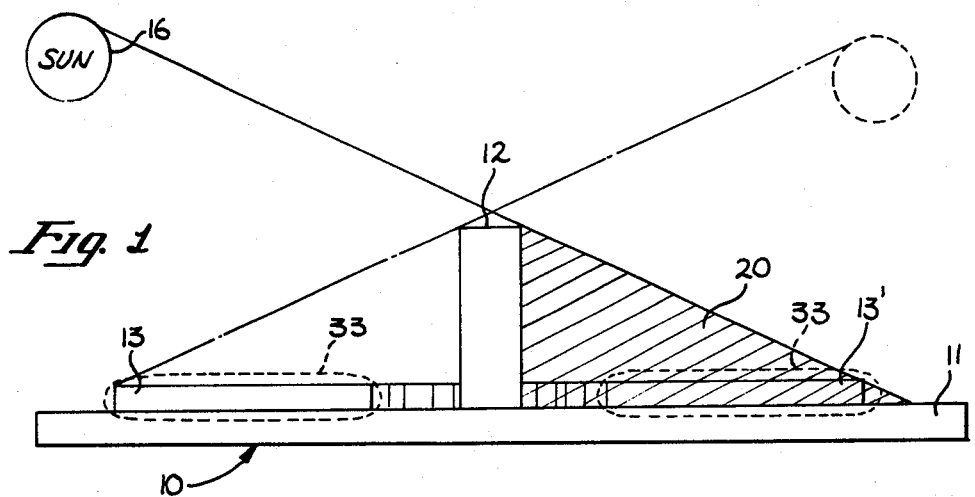
FIG. 1, is an elevation view of the transverse tracking mechanism.
Figure 2:
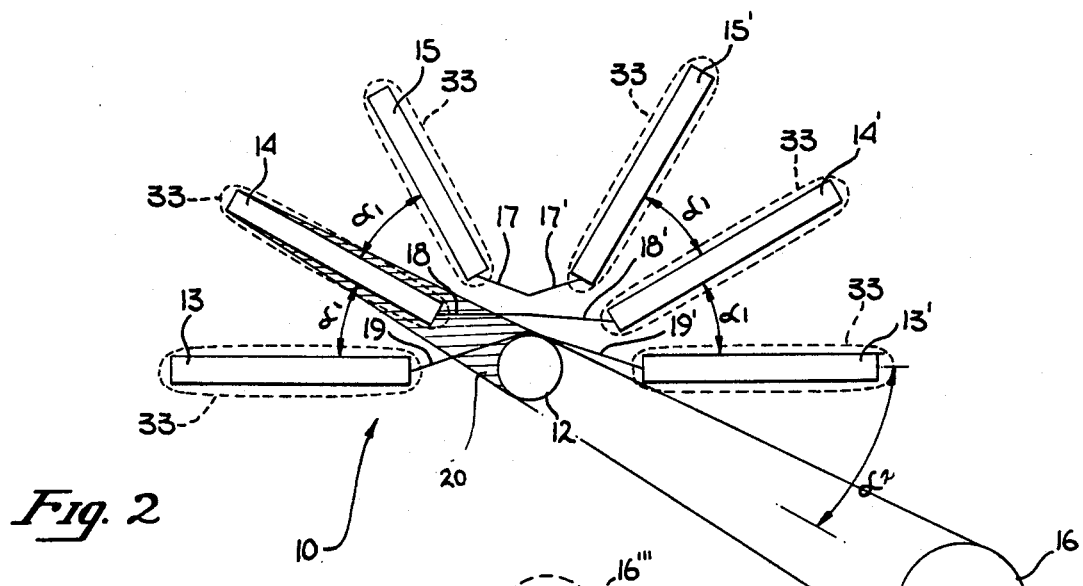
FIG. 2, is a plan view of the transverse tracking mechanism.

Referring first, to FIGS. 1 and 2, the tracking mechanism is shown. It will be described in reference to that drawing, however, it is understood that the preferred embodiment will have 20 phials. In this embodiment, only six phials are employed for simplicity of description sake. However, the greater number of phials employed, the greater the accuracy of the tracking mechanism, in the transverse direction.

FIG. 2, illustrates phials 13, 14, and 15, and their corresponding and opposing pair 13', 14' and 15'. In this embodiment, phial 13 is disposed on a base reference line. Phial 13' is disposed on the same base reference line as shown. Phial 14 is disposed radically and angle α, from phial 13, while phial 14' is disposed radically from phial 13' an equal angle α. Likewise, phials 15 and 15' are disposed radically an equal distance from phial 14 and 14' respectfully. In alternate embodiments, each phial positioned an angle α from the base reference line will have its corresponding pair positioned radially an angle 180°-α from the base reference line. A solid opaque post 12, is disposed at the radial apex. Post 12 has a width equal to the width of each of the phials. It should be noted that each phial is enclosed within an evacuated glass envelope 33. The glass envelope permits the phials to operate by the sun's radiation and prevents ambient interference which would make the operation of the heliostat erratic.

The transverse tracking mechanism is disposed in a fixed position relative to the heliostat. As the sun moves from east to west, the alignment of the sun and post cause a shadow to move through the arc so as to pass over phial 13 and phial 13'. As shown in FIG. 2, sun 16, and post 12, are aligned such that shadow 20 is disposed over phial 14. In FIG. 1, sun 16 and post 12, are aligned to cause shadow 20 to cover phial 13'.

The transverse tracking mechanism 10 tracks the sun 16 as it moves from east to west. Fluid filled phials are employed which are well known in the art which create a fluid pressure when exposed to heat or to solar radiation. The phials are coupled together hydraulically at the control valve in opposing pairs, ie., 13 and 13', 14 and 14', and 15 and 15', as shown in FIG. 2, by lines 17 and 17', 18 and 18', and 19 and 19'. When an opposing pair of phials, ie., 13 and 13', FIG. 2, are simultaneously exposed to solar radiation, an equal pressure is created in both phials and accordingly, no pressure differential exists. However, when one phial 14, FIG. 2, is covered by shadow 20, a pressure differential is created between phial 14 and phial 14'. The pressure differential diverts hydraulic fluid pressure to the A.M. or P.M. circuits. This signal is sent to the hydraulic circuit, as described hereinafter, and causes the heliostat to rotate to proper alignment. In operation, the sun rises as shown in FIG. 1, and phial 13' is covered by shadow 20. The heliostat is caused to rotate into horizontal alignment. As the sun moves, shadow 20 moves to cover phial 14' and the heliostat is again rotated to be in proper alignment. In a like manner, the entire transverse path of the sun can be tracked, employing either valves 71 and 73 as a pair or valves 72 and 74 as a pair, depending on whether the operation is A.M. or P.M.

As has been described, it should be recognized that as the number of phials is increased, the more accurate the horizontal tracking becomes. It has been found that in the preferred form, a phial should be disposed every 10°. This permits sufficient alignment without significant error and permits a heliostat to continue to be properly aligned so that the heliostat may operate at near optimum conditions.

Referring to FIG. 3, the elevation control mechanism 30 is shown. It is secured to the heliostat (not shown) so as to be rotated in the horizontal plane and always be facing the sun 16. A sun shield 31 is disposed between the sun and quadrant phial 32, causing a shadow to cover the entire phial 32. As the sun rises above the horizon 36, a portion of phial 32 is exposed to solar radiation creating a pressure in incapillary line 35. As the sun continues to rise above the horizon, a greater portion of phial 32 is exposed to solar radiation causing a greater pressure differential until it reaches its apex at/or about high noon. (Various positions of the sun are shown in phantom lines).

As the pressure is increased, the hydraulic logic system is devised so as to cause the heliostat to rotate into alignment in the vertical direction. As the sun begins to set, the pressure in the quadrant phial is reduced and the heliostat is lowered to be in continuous alignment with the sun.

Having now described the basic operating system, the logical hydraulic and mechanical operating systems will be described. The elevation system will first be described, followed by the transverse system and the zeroing system.

Referring first to FIG. 4, the elevation system is described showing how synchronizing in the vertical plane is accomplished by the modulating action of valves 51 and 52. Valve 51 is thermally controlled; valve 52 is mechanically controlled. Calibration of these two valves is such that a relationship exists where the flow area is calibrated to equal the per unit displacement of the spool. As an example, a 90° sun's exposure of phial 32 creates a pressure strong enough to move spool 53 in valve 51 to its maximum position against a soft spring 55. Also a rotation of shaft 58 of 90° causes the spool 54, in valve 52, to move to its extreme position against a soft spring 56. Accordingly, every angle of the sun's elevation of phial 32 exposure area can be related to a certain capillary pressure. Thus, movement of spool 53, in valve 51, is a function of sun's elevation and/or depression, while the movement of spool 54, in valve 53, is a function of mechanical displacement.

Valves 59, 60, and 61, (more fully described hereinafter) are coupled to valves 51 and 52 as shown in FIG. 4. Fluid flow through each valve shown in FIG. 4, is a function of their respective spool linear displacement from the closed position.

In normal operation as a pressure differential in created in phial 32, spool 53 in valve 51 is shifted, bringing valve 59 out of balance and causing spool 62 to shift to the right to allow fluid under pressure to enter the left end cap of cylinder 63, which drives a rack and pinion mechanism (not shown) and rotates shaft 58, thereby elevating the heliostat. Temporary overcase conditions present errors. Furthermore, if cloud cover occurred in the A.M and lifted thereafter, valve 51 would be shifted to allow more flow to pass. Meanwhile, the pressure compensating flow controls 65 and 66 are balanced for similar flows and pressures, thereby creating a differential, causing spool 62, in valve 59 to shift to the right and allow fluid under pressure to enter the left end, or cap end, of cylinder 63. By means of a rack and pinion mechanism (not shown) the extension rotates shaft 58, thereby elevating the heliostat. Simultaneously, cam 57, on shaft 58, is shifting spool 54, in valve 52, increasing its rating in so doing. During this process, the differential across valve 59 decreases continuously to zero until valve 59 centers, thus shutting off any energy supply to cylinder 63.

If an overcast is experienced in the afternoon, spool in valve 52 allows more fluid to flow than valve 51, since the sun is now in its setting cycle. The pressure differential now acts to shift spool 62 in valve 59, to the left. This allows fluid to enter rod-end of cylinder 63, causing retraction and hence depression. Depression continues until the differential across valve 59 ceases.

The foregoing illustrates that the elevation tracking system is capable of aligning vertically the heliostat even after interruptions such as overcast conditions.

It can be seen that valve 51 has other functions to perform besides differentiating. Note, that valve 51 is activated only if solar power is available. As soon as valve 51 is energized, fluid is piloted to cut-off valve 60, sequence valve 61, and the two-way trigger valve 65 of the "lock-circuit."

Valve 60 is a 2-position valve, spring offset, normally closed. Its function is to cut-off fluid energy to valve 52 when because of an interruption or during the night, differentials are not required.

Sequence valve 61 is a back-up unit to valve 60 assuring no fluid will flow to the pilot end of valve 59, when valve 51 is not operative.

Trigger, 2-position, pilot-operated valve 65 of the "lock circuit" de-energizes the brake 66, on the shaft of the vertical aligning shaft. This circuit functions as described below.

During overcast or night conditions, the heliostat elevation-depression axis is locked by a simple brake mechanism. When valve 65 is energized, trigger valve spool is shifted to the right allowing fluid under pressure to activate shuttle valve 67, and thus transmitting fluid under pressure to rod end of brake cylinder 68, releasing the brake 66. Point 69 of this circuit is a continuation of the zeroing circuit which is described later.

The transverse synchronizing circuit, shown in FIG. 5, is comprised of a selector valve which diverts fluid either to the A.M. or P.M. sub-circuits, depending on whether the operation is taking place in the morning or in the afternoon.

Once the A.M. or P.M. selection is made, synchronization is brought about by the modulating action of valve 71 or 72, working in conjunction with pressure-compensated flow control 73 or 74, in relation to pressure-compensated flow control 75, operating through modulating valve 76.

Calibration, which is carried out for every pair of command phials, ie., 13 and 13', is described below. (Refer to FIG. 2).

Phials 13 and 13' make an angle $\alpha$, and $(180\alpha)$ with the base reference line. In the morning (A.M.), phial 13 is blocked off from the sun's rays due to the shade created by pole 12. The complementary phial 13', receives the total amount of the radiant heat. Pressure build-up in the associated capillary 19' moves spool 77 in valve 70, to the left, thus energizing the A.M. circuit.

Pilot pressure will then activate valve 72, allowing fluid to flow to cap-end of train cylinder 78 and cut-off valve 79, which makes the line to modulating valve 76 live.

Rod of cylinder 78 now extends, rotating the heliostat mount in the transverse direction. Turning of this shaft 80, also makes the cam 81, on shaft 80, bear on valve 76, thus activating flow control 75. Accordingly, for an angle $\alpha$, valve 72, modulates between the differential created by flow controls 75 and 74. The piston in cylinder 78, keeps moving or extending until the cam 81 displaces the spool 82, in valve 76, to such an extent that its rating develops the same flow through control 75, as exists in flow control 74. In operation, flow through control 75, when the cam 81, on shaft 80, turns through an angle $\alpha$, must be the same as the flow through control 74, when phials 13 and 13', at the angle of comparison $\alpha$, are excited. This calibrates for train during morning operation at an angle $\alpha$.

In the afternoon, the complementary angle is $180°-\alpha$. Now phial 13' is blocked off and excitation of phial 13 causes spool 77, in valve 70, to shift to the right, thus energizing the P.M. sub-circuit. Flow through control 73 is adjusted to be the same as the flow through control 75, when valve 76 spool 82 is shifted in proportion to the displacement caused by cam 81 when rotated to $180°-\alpha$. The circuit is capable of training the heliostat mount, approaching true, continuous operation and also capable of tracking and focusing the heliostat in transverse direction even after an interruption takes place.

A brake circuit having valve 65', shuttle valve 67', cylinder 68' and brake shoe 66, operates as previously described for the elevation mode. Note, that point 69 is common with the elevation and zeroing circuit.

For synchronization in train at mid-day, the comparing phials are located one to the north of the pole and the other to the south of the pole. For this set, valve 70 is substituted by incorporating a 2-position, spring-centered, thermally piloted valve 85, and modulating valve 86, FIG. 5, and a flow control 87.

The zeroing circuit as shown in FIG. 6 is designed to turn the heliostat about its horizontal axis to assume an angle of 90° with the vertical and also to train the mount so that the heliostat faces magnetic east. This operation takes place when the sun sets below the horizon for the day.

The zeroing unit is triggered by means of a float-lever mechanism operating in timing tank 90. This action takes place every 24 hours. Adjustment is made on flow control 91. As soon as the float overcomes the detent spring 92, of valve 106, signals are transmitted to pilot and activate zeroing valve 94, timing tank dump valve 95, and to the brake circuits at 69, as shown in FIGS. 4, 5, and 6.

Two-position, 4-way valve 94, allows fluid to the rod end of elevation/depression cylinder 96, through check valve 97, thus retracting the rod 98. The return fluid is transmitted to the tank through check valve 99.

When retraction of the elevation/depression cylinder rod 98 is completed, pressure build-up activates sequence valve 100, allowing fluid to the rod end of train cylinder 101. The return fluid is transmitted to the tank through check valve 103.

As soon as retraction is completed, sequence valve 104 is activated, causing fluid to be transmitted to pilot valve 106 to the closed position. This operation bleeds pilots of valve 94 and valve 95, and allows the brakes to set by spring action. Also, cam 108, on valve 106 extension rod activates valve 107 and this bleeds valve 106 pilot line to tank. Valve 109 is a thermal relief valve connected on line between sequence valve 100, and check valve 110. This prevents pressure build-up in this line during high temperature day light operating conditions.

I claim:

1. An automatic hydraulic/thermal system for powering a tracking mechanism of a heliostat comprising at least a first means for sensing solar radiation and for selectively creating a first signal fluid pressure in response to said solar radiation, said first sensing means coupled to a first hydraulic logic circuit, said first means for sensing disposed adjacent to a first opaque shield such that said opaque shield is disposed between said sun and said first means for sensing, said first opaque shield for casting a shadow, said shadow for alternately covering portions of said first sensing means as said sun moves across the sky to indicate the relative position of said sun and for creating a specific first fluid signal pressure in response thereto, said first fluid signal pressure for energizing said first hydraulic logic circuit and for activating said first mechanical means for aligning said heliostat so as to receive direct radiation from said sun, said first sensing means comprising at least one pair or phials, each disposed within an evacuated transparent envelope and disposed from a base reference line and angle of $\alpha°$ and $(180°-\alpha°)$ respectively where $\alpha°$ is between (0° and 90°,) said at least one pair of phials coupled one to one end and the other to the other end of a diverting valve in said first hydraulic logic circuit, as said shadow from said first opaque shield covers one of said phials of at least said one pair of phials a pressure differential is created between said at least one pair of phials, said pressure differential being identified by said diverting valve for transmitting a signal to said first hydraulic logic circuit for reacting to said pressure signal and for activating said first mechanical means to position said heliostat into proper alignment with said sun so as to receive direct solar radiation.

2. The automatic hydraulic/thermal system of claim 1, wherein at least 9 pairs of phials are disposed radially at equal angular displacement, about said first opaque shield through 0° and 180°, the first phial of each of said pair of phials being disposed in the first quadrant (between 90° and 180°) and the second phial of each of said pair of phials being disposed in the second quadrant (between 90° and 180°); said 0° phial is in line with magnetic east, said 180° phial is in line with magnetic west; and wherein a first phial is in line with magnetic north paired with a second phial disposed in line with magnetic north and paired with a second phial disposed at magnetic south.

3. The automatic hydraulic/thermal system of claim 1, wherein said first sensing means is used to align said heliostat into longitudinal relationship with said sun so that said heliostat can receive direct solar radiation.

4. The automatic hydraulic system of claim 3, wherein a third hydraulic logic circuit is coupled to said first mechanical means for rotating said heliostat back to magnetic east after the sun sets below the horizon each day.

5. The automatic hydraulic/thermal system of claim 1, wherein said first hydraulic logic circuit is comprised of at least:

(a) a selecting valve for energizing the a.m. or p.m. circuit of said first hydraulic logic circuit, one end of said selecting valve coupled to one of said at least one pair of phials and the other end to the other of said at least one pair of phials, said selecting valve being activated as said shadow covers one of said at least one pair of phials causing a pressure differential to exist and thereby activating either the a.m. or p.m. circuit and sending a pilot signal pressure to said first hydraulic logic circuit;

(b) a first valve coupled to said selecting valve being activated during a.m. operation for sensing said pilot signal pressure and for causing a first fluid pressure in response to said pilot signal pressure;

(c) a second valve coupled to said selecting valve being activated during p.m. operation for sensing said pilot signal pressure and for causing a first fluid pressure in response to said pilot signal pressure;

(d) a third valve for sensing displacement of said first mechanical means and for causing a second fluid pressure in response thereto, said first, second and third valves being calibrated such that a specific pilot signal pressure will cause said first or second valve to produce a first fluid pressure equal to said second fluid pressure produced by said third valve in response to a specific displacement of said first mechanical means;

(e) a fourth valve coupled to said first, second and third valve, and said first mechanical means, said fourth valve for sensing said first fluid pressure and for driving said first mechanical means in response thereto, displacement of said first mechanical means causing said third valve to emit said second fluid pressure equal to said first fluid pressure, said second fluid pressure for equalizing the pressure in said fourth valve and said first hydraulic logic circuit, thereby stopping the displacement of said first mechanical means;

whereby said first mechanical means positions said heliostat in longitudinal alignment with said sun.

6. The automatic hydraulic/thermal system of claim 1, wherein said first opaque shield is a post having a width equal to the width of one of said phials, the base of said post disposed at the intersection of the radial extensions of said phials.

7. The automatic hydraulic system of claim 1 wherein said third hydraulic logic circuit is driven by a 24 hour hydraulic timing tank.

8. The automatic hydraulic/thermal system of claim 1, wherein a second sensing means is disposed to align said heliostat into latitudinal relationship with said sun so that said heliostat can receive direct solar radiation.

9. The automatic hydraulic/thermal system of claim 8 wherein said second means for sensing solar radiation is coupled to a second hydraulic logic circuit, said second means for sensing disposed adjacent to a second opaque shield and mounted such that said second opaque shield is disposed between said sun and said second means for sensing, said second opaque shield for casting a shadow, said shadow for limiting exposure of said second means for sensing direct radiation of said sun, said exposure being a maximum at high noon to a minimum at sunrise and sunset, said second fluid signal pressure for energizing said second hydraulic logic circuit which activates a scond mechanical means to move said heliostat into latitudinal relationship with said sun so that said heliostat can receive direct solar radiation.

10. The automatic hydraulic/thermal system of claim 9, wherein said second sensing means is a single phial enclosed within a evacuated transparent envelope, said phial for producing said second fluid signal pressure and for transmitting said second fluid signal pressure to said second hydraulic logic circuit and for increasing said second fluid signal pressure as a greater surface area of said phial is exposed to solar radiation.

11. The automatic hydraulic/thermal system of claim 10 wherein said single phial is quadrant in shape and disposed such that its outer curvature faces said heliostat, its inner curvature faces the sun, and is disposed in a latitudinal relationship with said heliostat.

12. The automatic hydraulic/thermal system of claim 9 wherein said second hydraulic logic circuit is comprised of at least:
   (a) a first valve for sensing said second signal fluid pressure and for causing a first fluid pressure in said second hydraulic logic circuit in response thereto;
   (b) a second valve for sensing displacement of said second mechanical means and for causing a second fluid pressure in response thereto, said first and second valves being calibrated such that a specific signal fluid pressure will cause said first valve to produce a first fluid pressure equal to the second fluid pressure produced by said second valve in response to a specific displacement of said second mechanical means;
   (c) a third valve coupled to said first and second valve and said second mechanical means, said third valve for sensing said first fluid pressure and for driving said second mechanical means in response thereto, displacement of said second mechanical means causing said second valve to emit said second fluid pressure equal to said first fluid pressure, said second fluid pressure for equalizing the pressure in said third valve and said second hydraulic logic circuit thereby stopping the displacement of said second mechanical means;
whereby said first mechanical means positions said heliostat in latitudinal alignment with said sun.

* * * * *